United States Patent
Punjani et al.

(10) Patent No.: US 11,680,914 B2
(45) Date of Patent: Jun. 20, 2023

(54) METHODS AND SYSTEMS FOR 3D STRUCTURE ESTIMATION USING NON-UNIFORM REFINEMENT

(71) Applicant: THE GOVERNING COUNCIL OF THE UNIVERSITY OF TORONTO, Toronto (CA)

(72) Inventors: Ali Punjani, Toronto (CA); David Fleet, Toronto (CA); Haowei Zhang, Toronto (CA)

(73) Assignee: THE GOVERNING COUNCIL OF THE UNIVERSITY OF TORONTO, Toronto (CA)

(*) Notice: Subject to any disclaimer, the term of this patent is extended or adjusted under 35 U.S.C. 154(b) by 348 days.

(21) Appl. No.: 16/753,240

(22) PCT Filed: Oct. 5, 2018

(86) PCT No.: PCT/CA2018/051262
§ 371 (c)(1),
(2) Date: Apr. 2, 2020

(87) PCT Pub. No.: WO2019/068201
PCT Pub. Date: Apr. 11, 2019

(65) Prior Publication Data
US 2020/0333270 A1 Oct. 22, 2020

Related U.S. Application Data

(60) Provisional application No. 62/569,249, filed on Oct. 6, 2017.

(51) Int. Cl.
*G06T 11/00* (2006.01)
*G01N 23/2251* (2018.01)
(Continued)

(52) U.S. Cl.
CPC ......... *G01N 23/2251* (2013.01); *G06T 3/40* (2013.01); *G06T 11/006* (2013.01); *G06T 17/00* (2013.01);
(Continued)

(58) Field of Classification Search
None
See application file for complete search history.

(56) References Cited

U.S. PATENT DOCUMENTS
2017/0103161 A1  4/2017  Brubaker et al.

FOREIGN PATENT DOCUMENTS
CA  2919271 A1  2/2015
EP  2400982 B1  5/2016

OTHER PUBLICATIONS

Ali Punjani et al: "cryoSPARC: algorithms for rapid unsupervised cryo-EM structure determination", Nature Methods, vol. 14, No. 3, Mar. 1, 2017 (Mar. 1, 2017), pp. 290-296, XP055631965, New York, ISSN: 1548-7091, DOI: 10.1038/nmeth.4169.
(Continued)

*Primary Examiner* — Robert J Craddock
(74) *Attorney, Agent, or Firm* — Bhole IP Law; Anil Bhole; Marc Lampert

(57) ABSTRACT

There is provided systems and methods for generating 3D structure estimation of at least one target from a set of 2D Cryo-electron microscope particle images. The method includes: receiving the set of 2D particle images of the target from a Cryo-electron microscope; splitting the set of particle images into at least a first half-set and a second half-set; iteratively performing: determining local resolution estimation and local filtering on at least a first half-map associated with the first half-set and a second half-map associated with the second half-set; aligning 2D particles from each of the half-sets using at least one region of the associated half-map;
(Continued)

for each of the half-maps, generating an updated half-map using the aligned 2D particles from the associated half-set; and generating a resultant 3D map using all the half-maps.

4 Claims, 8 Drawing Sheets

(51) Int. Cl.
    G06T 3/40        (2006.01)
    G06T 17/00      (2006.01)
    G06V 10/764     (2022.01)
    G06V 20/69      (2022.01)
    G06V 20/64      (2022.01)

(52) U.S. Cl.
    CPC ............ *G06V 10/764* (2022.01); *G06V 20/64* (2022.01); *G06V 20/693* (2022.01); *G06V 20/695* (2022.01); *G06V 20/698* (2022.01); *G01N 2223/3103* (2013.01); *G01N 2223/401* (2013.01)

(56) References Cited

OTHER PUBLICATIONS

Supplementary European Search Report, European Patent Application No. EP18864247, dated Jun. 11, 2021.
Yi Fan Cheng et al: "A Primer to Single-Particle Cryo-Electron Microscopy", Cell, vol. 161, No. 3, Apr. 1, 2015 (Apr. 1, 2015), pp. 438-449, P055441235, Amsterdam NL, ISSN: 0092-8674, DOI:10 .1016/j. ce 11 .2015. 03. 050.
Cardone Giovanni et al., "One number does not fit all: Mapping local variations in resolution in cryo-EM reconstruction", Journal of Structural Biology, Academic Press, United States, vol. 184, No. 2, Aug. 14, 2013 (Aug. 14, 2013), pp. 226-236, XP028768071, ISSN: 1047-8477, DOI: 10.1016/J.JSB.2013.08.002.
EMAN2.2 Reconstruction Tutorial Using the Project Manager, https://blake.bcm.edu/emanwiki/EMAN2/Tutorials?action=AttachFile &do=get&target=EMAN2-2Tutorial.pdf, Jan. 2017.
S. Schilbach1, et al., Structures of transcription pre-initiation complex with TFIIH and Mediator, Macmillan Publishers Limited, part of Springer Nature, Nov. 9, 2017.
S. Agarwal, N. Snavely, I. Simon, S. M. Seitz, and R. Szeliski, "Building rome in a day," in ICCV, 2009.
S.-I. Amari, H. Park, and K. Fukumizu, "Adaptive method of realizing natural gradient learning for multilayer perceptrons," Neural Computation, vol. 12, No. 6, pp. 1399-1409, 2000.
S. Amari, "Natural gradient works efficiently in learning," Neural Computation, vol. 10, No. 2, pp. 251-276, 1998.
W. T. Baxter, R. A. Grassucci, H. Gao, and J. Frank, "Determination of signal-to-noise ratios and spectral snrs in cryoem low-dose imaging of molecules," J Struct Biol, vol. 166, No. 2, pp. 126-132, May 2009.
J. Besag, "Statistical analysis of non-lattice data," Journal of the Royal Statistical Society. Series D (The Statistician), vol. 24, No. 3, pp. 179-195, 1975.
R. Bhotika, D. Fleet, and K. Kutulakos, "A probabilistic theory of occupancy and emptiness," in ECCV, 2002.
J. de la Rosa-Trevín, J. Otòn, R. Marabini, A. Zaldivar,J. Vargas, J. Carazo, and C. Sorzano, "Xmipp 3.0: An im-proved software suite for image processing in electron microscopy," Journal of Structural Biology, vol. 184, No. 2, pp. 321-328, 2013.
A. Doucet, S. Godsill, and C. Andrieu, "On sequential Monte Carlo sampling methods for Bayesian filtering," Statistics and Computing, vol. 10, No. 3, pp. 197-208, 2000.
M. Graf and D. Potts, "Sampling sets and quadrature formulae on the rotation group," Numerical Functional Analysis and Optimization, vol. 30, No. 7-8, pp. 665-688, 2009.
J. Gregson, M. Krimerman, M. B. Hullin, and W. Heidrich, "Stochastic tomography and its applications in 3d imaging of mixing fluids," ACM Trans. Graph. (Proc. SIGGRAPH 2012), vol. 31, No. 4, pp. 52:1-52:10, 2012.
N. Grigorieff, "Frealign: high-resolution refinement of sin-gle particle structures," J Struct Biol, vol. 157, No. 1, p. 117-125, Jan. 2007.
W. Wriggers, et al., "Outcome of the first electron microscopy validation task force meeting," Struc-ture, vol. 20, No. 2, pp. 205-214, 2012.
J. Hsieh, Computed Tomography: Principles, Design, Artifacts, and Recent Advances. SPIE, 2003.
M. Jaitly, M. A. Brubaker, J. Rubinstein, and R. H. Lilien, "A Bayesian Method for3-D Macromolecular Structure Inference using Class Average Images from Single Particle Elec-tron Microscopy," Bioinformatics, vol. 26, pp. 2406-2415, 2010.
J. Keeler, Understanding NMR Spectroscopy. Wiley, 2010.
K. N. Kutulakos and S. M. Seitz, "A theory of shape by space carving," IJCV, vol. 38, No. 3, pp. 199-218, 2000.
R. Langlois, J. Pallesen, J. T. Ash, D. N. Ho, J. L. Rubin-stein, and J. Frank, "Automated particle picking for low-contrast macromolecules in cryoelectron microscopy," Journal of Structural Biology, vol. 186, No. 1, pp. 1-7, 2014.
W. C. Y. Lau and J. L. Rubinstein, "Subnanometre-resolution structure of the intact Thermus thermophilus H+-driven ATP synthase," Nature, vol. 481, pp. 214 218, 2012.
N. Le Roux and A. Fitzgibbon, "A fast natural Newton method," in ICML, 2010.
N. Le Roux, M. Schmidt, and F. Bach, "A stochastic gradient method with an exponential convergence rate for strongly convex optimization with finite training sets," in NIPS, 2012.
X. Li, P. Mooney, S. Zheng, C. R. Booth, M. B. Braunfeld, S. Gubbens, D. A. Agard, and Y. Cheng, "Electron counting and beam-induced motion correction enable near-atomic-resolution single-particle cryoem," Nature Methods, vol. 10, No. 6, pp. 584-590, 2013.
S. P. Mallick, B. Carragher, C. S. Potter, and D. J. Kriegman, "Ace: Automated {CTF} estimation," Ultramicroscopy, vol. 104, No. 1, pp. 8-29, 2005.
S. P. Mallick, S. Agarwal, D. J. Kriegman, S. J. Belongie, B. Carragher, and C. S. Potter, "Structure and view estimation for tomographic reconstruction: A bayesian approach," in CVPR, 2006.
J. Martens, "Deep learning via hessian-free optimization," in ICML, 2010.
J. A. Mindell and N. Grigorieff, "Accurate determination of local defocus and specimen tilt in electron microscopy," Journal of Structural Biology, vol. 142, No. 3, pp. 334-347, 2003.
Y. Nesterov, "A method of solving a convex programming problem with convergence rate o (1/k2)," Soviet Mathematics Doklady, vol. 27, No. 2, pp. 372-376, 1983.
B. Polyak, "Some methods of speeding up the convergence of iteration methods," USSR Computational Mathematics and Mathematical Physics, vol. 4, No. 5, pp. 1-17, 1964.
J. L. Rubinstein, J. E. Walker, and R. Henderson, "Structure of the mitochondrial atp synthase by electron cryomicroscopy," The EMBO Journal, vol. 22, No. 23, pp. 6182-6192, 2003.
B. Rupp, (2009). Biomolecular Crystallography: Principles, Practice and Application to Structural Biology. Garland Science, 2009.
S. H. W. Scheres, H. Gao, M. Valle, G. T. Herman, P. P. B. Eggermont, J. Frank, and J.-M. Carazo, "Disentangling conformational states of macromolecules in 3d-em through like-lihood optimization," Nature Methods, vol. 4, pp. 27-29, 2007.
S. H. Scheres, "RELION: Implementation of a Bayesian approach to cryo-EM structure determination ," Journal of Structural Biology, vol. 180, No. 3, pp. 519-530, 2012.
F. Sigworth, "A maximum-likelihood approach to single-particle image refinement," Journal of Structural Biology, vol. 122, No. 3, pp. 328-339, 1998.
I. Sutskever, J. Martens, G. Dahl, and G. Hinton, "On the importance of initialization and momentum in deep learning," in ICML, 2013.

(56) References Cited

OTHER PUBLICATIONS

G. Tang, L. Peng, P. Baldwin, D. Mann, W. Jiang, I. Rees, and S. Ludtke, "EMAN2: an extensible image processing suite for electron microscopy," Journal of Structural Biology, vol. 157, No. 1, pp. 38-46, 2007.

T. Tokdar and R. E. Kass, "Importance sampling: a review," Wiley Interdisciplinary Reviews: Computational Statistics, vol. 2, No. 1, pp. 54-60, 2010.

Z. Xu, A. L. Horwich, and P. B. Sigler, "The crystal structure of the asymmetric GroEL-GroES-(ADP)7 chaperonin complex," Nature, vol. 388, pp. 741-750, 1997.

J. Zhao, M. A. Brubaker, and J. L. Rubinstein, "TMaCS: A hybrid template matching and classification system for partially-automated particle selection," Journal of Structural Biology, vol. 181, No. 3, pp. 234-242, 2013.

Marcus Brubaker, et al. Building Proteins in a Day: Efficient 3D Molecular Reconstruction, IEEE Computer Vision and Pattern Recognition (CVPR) 2015—Published Jun. 12, 2015; Arxiv Apr. 14, 2015.

International Search Report and Written Opinion, PCT/CA2018/051262, dated Jan. 4, 2019.

Charles V. Sindelar, et al., Optimal noise reduction in 3D reconstructions of single particles using a volume-normalized filter, May 18, 2012 (online), Journal of Structural Biology 180, pp. 26-38.†

Steve Ludtke, et al., Turned tophat into a string option. takes a "local" or "global" parameter to include local filtration as part of the refinement process, EMAN2 Code Commit at github, includes programs "e2refine_easy.py," "e2fsc.py," "e2refine_postprocess.py," Oct. 22, 2016 (online), https://github.com/cryoem/eman2/commit/28bc1daaf4e880423d5cc2dcfb347a177f6b0dae#diff-53689aacbba32f62a7ee90c641493951, 73 pages.†

Alp Kucukelbir, et al., Quantifying the local resolution of cryo-Em density map, Nature Methods, vol. 11, No. 1, Nov. 10, 2013 (online), pp. 63-67.†

S.H.W. Scheres, Processing of Structurally Heterogeneous Cryo-EM Data in RELION, Chapter Six of Methods in Enzymology, vol. 579, May 31, 2016 (online), pp. 125-157.†

James M. Bell, et al., High resolution single particle refinement in EMAN2.1, Feb. 27, 2016 (online), Methods 100 (2016), pp. 25-34.†

† cited by third party

METHODS AND SYSTEMS FOR 3D STRUCTURE ESTIMATION USING NON-UNIFORM REFINEMENT

TECHNICAL FIELD

The following relates generally to electron Cryo-microscopy; and more specifically, to systems and methods for 3D structure estimation from electron Cryo-microscopy images using non-uniform refinement.

BACKGROUND

Biological processes occur as the result of binding and chemical interactions between molecules inside cells. The majority of these molecules are protein structures, constructed from 20 different amino acid monomer building blocks. Each different type of protein, coded in DNA, is a unique sequence of these monomers joined into a chain. These chains fold into 3D shapes during construction and it is this final 3D structure that determines the function of the protein. Because function depends on structure, discovering the structures of viruses, proteins and other molecules is fundamental to understanding biological processes, and is an important part of discovering drugs that can inhibit or accelerate the action of specific proteins involved in disease pathways.

Electron Cryo-microscopy (also referred to as Cryo-electron microscopy or "cryo-EM") is a technique for discovering the 3D atomic structures of protein molecules. In Cryo-EM, large sets of 2D images (known as "particle images"), often numbering in the millions, are captured using an electron microscope. The particle images are of a cryogenically frozen sample consisting of hundreds to thousands of copies of a protein molecule or protein-drug complex (known as a "target"). The particle images can then be computationally assembled to reconstruct and refine a 3D map of the target.

SUMMARY

In an aspect, there is provided a method for generating 3D structure estimation of at least one target from a set of 2D Cryo-electron microscope particle images, the method executed on at least one processing unit, the method comprising: receiving the set of 2D particle images of the target from a Cryo-electron microscope; splitting the set of particle images into at least a first half-set and a second half-set; iteratively performing: determining local resolution estimation and local filtering on at least a first half-map associated with the first half-set and a second half-map associated with the second half-set; aligning 2D particles from each of the half-sets using at least one region of the associated half-map; for each of the half-maps, generating an updated half-map using the aligned 2D particles from the associated half-set; and generating a resultant 3D map using the half-maps; and outputting an estimated 3D structure of the target based on the resultant 3D map.

In a particular case, the local resolution estimation is determined using local windowed Fourier Shell Correlation (FSC) to separately measure the local resolution at a plurality of positions of the first half-map and the second half-map.

In another case, the local resolution estimation comprises: selecting successive subsections, each subsection having a centre position comprising one of the plurality of positions of the first half-map or the second half-map; for each subsection, determining a resolution for the subsection using Gold-Standard FSC (GS-FSC) and associating the resolution with the centre position of the respective half-map; and building a local resolution map comprising each of the centre positions and the associated resolution.

In yet another case, when the GS-FSC determination for a given subsection is below a predetermined threshold, the wavelength at which this occurs becomes the resolution.

In yet another case, the local resolution estimation is repeated for multiple iterations, where each iteration comprises a different predetermined threshold, and wherein the local resolutions from each iteration for a given position are combined using a weighted sum weighted by the predetermined threshold used for that iteration.

In yet another case, the iterations are continued until a global average GS-FSC computed over the entire 3D map improves less than a given threshold.

In yet another case, the local resolution estimation is determined at spaced-apart positions on the first half-map and on the second half-map.

In yet another case, the local resolution estimation is determined with the space between positions at a first distance, and wherein at positions of higher resolution, local resolution estimation is determined with the space between positions at a second distance, the second distance is smaller than the first distance.

In yet another case, the local filtering comprises median filtering by replacing each local resolution estimation with a median of local resolution estimates within a predetermined distance.

In yet another case, the local filtering comprises local windowed Fourier-domain low-pass filtering.

In yet another case, the local filtering comprises local adaptive filtering.

In yet another case, the local adaptive filtering comprises Bessel-Lanczos filtering.

In yet another case, the local adaptive filtering comprises Gaussian kernel filtering.

In yet another case, performing local resolution estimation and performing local filtering can be collectively determined by performing optimization, the optimization comprising minimizing a discrepancy between the first half-map and the second half-map after each half-map is filtered by a parameterized filtering operation.

In yet another case, the filtering operation is selected from a group consisting of local adaptive filtering, neural network filtering, non-isotropic filtering, and masking.

In yet another case, minimizing the discrepancy comprises minimizing the squared distance between the locally filtered first map and the second map, added to the squared distance between the first map and the local filtered second map.

In yet another case, minimizing the discrepancy further comprises adding a smoothness penalty acting on the locally filtered first map and the locally filtered second map.

In yet another case, the smoothness penalty comprises a second-derivative operator.

In yet another case, the method further comprising splitting the first half-set into a first quarter-set and a second quarter-set and splitting the second half-set into a third quarter-set and a fourth quarter-set; and wherein the local resolution estimation and the local filtering are performed on quarter-maps associated with each quarter-set, the aligning performed on each of the quarter-maps, the updating performed on each of the quarter-maps, and the generating a resultant 3D map uses the updated quarter-maps.

In yet another case, performing local resolution estimation and performing local filtering can be collectively determined by performing optimization, the optimization comprising minimizing a discrepancy between the first quarter-set and the second quarter-set and between the third quarter-set and the fourth quarter-set, after each quarter-set is filtered by a parameterized filtering operation In yet another case, the local resolution estimation is determined using local windowed Fourier Shell Correlation (FSC), the local windowed FSC having a smooth window function and a tunable window size.

In yet another case, the local resolution estimation is determined by transforming local regions of the half-maps into a wavelet basis, and comparing signal and noise characteristics, in that basis, between the half-maps.

In another aspect, there is provided a system for generating 3D structure estimation of at least one target from a set of 2D Cryo-electron microscope particle images the system comprising one or more processors and a data storage device, the one or more processors configured to execute: a particle image module to receive the set of 2D particle images of the target from a Cryo-electron microscope; a reconstruction module to split the set of particle images into at least a first half-set and a second half-set, and to iteratively perform: determining local resolution estimation and local filtering on at least a first half-map associated with the first half-set and a second half-map associated with the second half-set; aligning 2D particles from each of the half-sets using at least one region of the associated half-map; for each of the half-maps, generating an updated half-map using the aligned 2D particles from the associated half-set; and generating a resultant 3D map using the half-maps; and an output module to output an estimated 3D structure of the target based on the resultant 3D map.

In a particular case, the local resolution estimation is determined using local windowed Fourier Shell Correlation (FSC) to separately measure the local resolution at a plurality of positions of the first half-map and the second half-map.

In another case, the local resolution estimation comprises: selecting successive subsections, each subsection having a centre position comprising one of the plurality of positions of the first half-map or the second half-map; for each subsection, determining a resolution for the subsection using Gold-Standard FSC (GS-FSC) and associating the resolution with the centre position of the respective half-map; and building a local resolution map comprising each of the centre positions and the associated resolution.

In yet another case, when the GS-FSC determination for a given subsection is below a predetermined threshold, the predetermined threshold becomes the resolution.

In yet another case, the local resolution estimation is repeated for multiple iterations, where each iteration comprises a different predetermined threshold, and wherein the local resolutions from each iteration for a given position are combined using a weighted sum weighted by the predetermined threshold used for that iteration.

In yet another case, the local resolution estimation is determined at spaced-apart positions on the first half-map and on the second half-map.

In yet another case, the local resolution estimation is determined with the space between positions at a first distance, and wherein at positions of higher resolution, local resolution estimation is determined with the space between positions at a second distance, the second distance is smaller than the first distance.

In yet another case, the local filtering comprises median filtering by replacing each local resolution estimation with a median of local resolution estimates within a predetermined distance.

In yet another case, the local filtering comprises local windowed Fourier-domain low-pass filtering.

In yet another case, the local filtering comprises local adaptive filtering.

In yet another case, the local adaptive filtering comprises Bessel-Lanczos filtering.

In yet another case, the local adaptive filtering comprises Gaussian kernel filtering.

In yet another case, performing local resolution estimation and performing local filtering can be collectively determined by performing optimization, the optimization comprising minimizing a discrepancy between the first half-map and the second half-map after each half-map is filtered by a parameterized filtering operation.

In yet another case, the filtering operation is selected from a group consisting of local adaptive filtering, neural network filtering, non-isotropic filtering, and masking.

In yet another case, minimizing the discrepancy comprises minimizing the squared distance between the locally filtered first map and the second map, added to the squared distance between the first map and the local filtered second map.

In yet another case, minimizing the discrepancy further comprises adding a smoothness penalty acting on the locally filtered first map and the locally filtered second map.

In yet another case, the smoothness penalty comprises a second-derivative operator.

In yet another case, the reconstruction module further splits the first half-set into a first quarter-set and a second quarter-set and splitting the second half-set into a third quarter-set and a fourth quarter-set; and wherein the local resolution estimation and the local filtering are performed on quarter-maps associated with each quarter-set, the aligning performed on each of the quarter-maps, the updating performed on each of the quarter-maps, and the generating a resultant 3D map uses the updated quarter-maps.

In yet another case, performing local resolution estimation and performing local filtering can be collectively determined by performing optimization, the optimization comprising minimizing a discrepancy between the first quarter-set and the second quarter-set and between the third quarter-set and the fourth quarter-set, after each quarter-set is filtered by a parameterized filtering operation In yet another case, the local resolution estimation is determined using local windowed Fourier Shell Correlation (FSC), the local windowed FSC having a smooth window function and a tunable window size.

In yet another case, the local resolution estimation is determined by transforming local regions of the half-maps into a wavelet basis, and comparing signal and noise characteristics, in that basis, between the half-maps.

These and other aspects are contemplated and described herein. It will be appreciated that the foregoing summary sets out representative aspects of systems and methods to assist skilled readers in understanding the following detailed description.

DESCRIPTION OF THE DRAWINGS

The features of the invention will become more apparent in the following detailed description in which reference is made to the appended drawings wherein.

DETAILED DESCRIPTION

Figure 1:
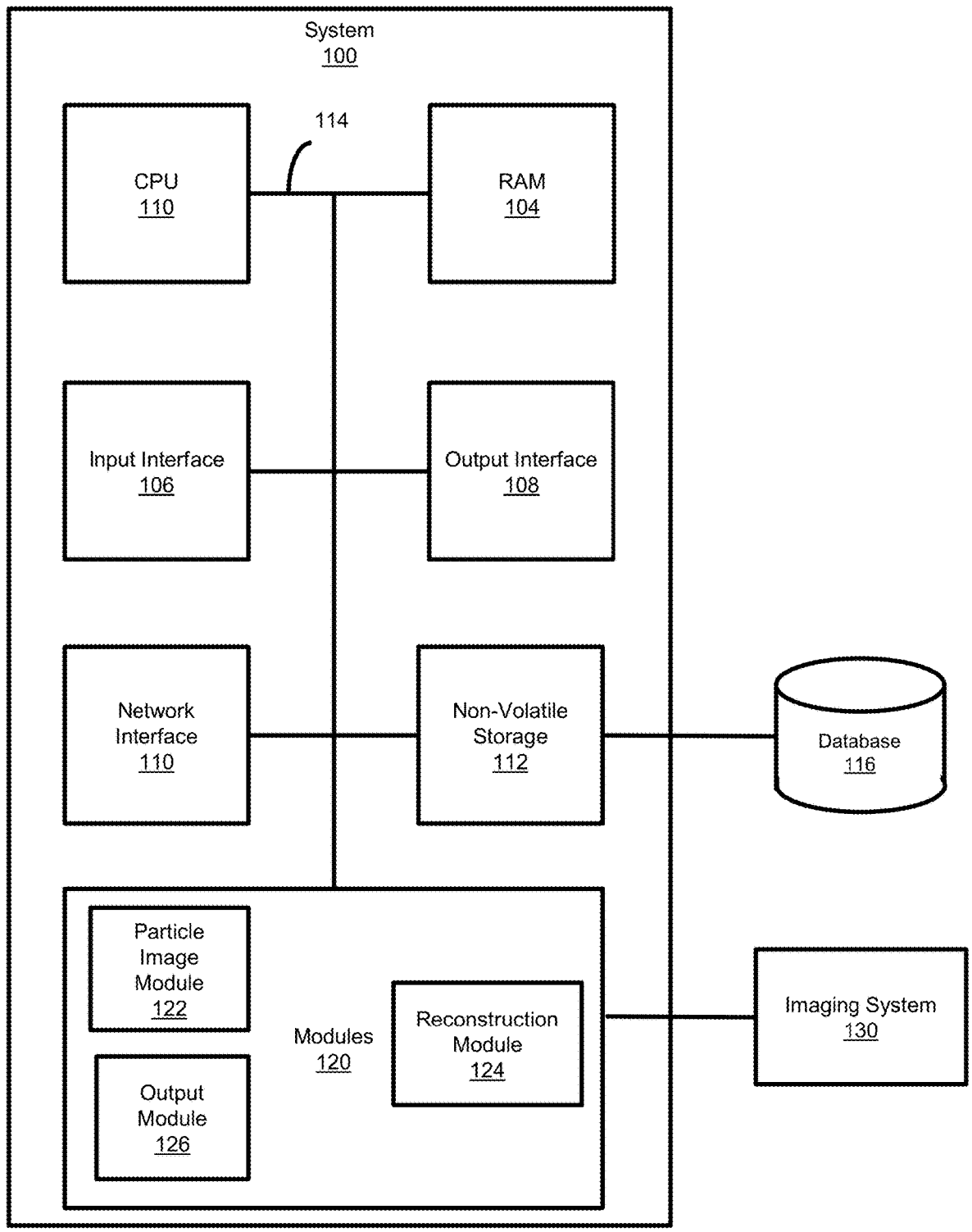
FIG. 1 shows a system for 3D structure estimation of at least one target from a set of 2D Cryo-electron microscope particle images, according to an embodiment.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

Various techniques can be used to attempt to determine 3D structures of proteins, viruses and other molecules from images thereof. Once images of a target molecule are collected, determination of a 3D structure of the molecule requires the successful completion of a difficult reconstruction of the 3D structure from the images.

For example, Electron Cryo-microscopy (referred to as "cryo-EM") is an emerging, computer vision-based approach to 3D macromolecular structure determination. Cryo-EM is applicable to medium to large-sized molecules in their native state. This scope of applicability is in contrast to X-ray crystallography, which requires a crystal of the target molecule, which are often impossible to grow, or nuclear magnetic resonance (NMR) spectroscopy, which is limited to relatively small molecules. Cryo-EM has the potential to unveil the molecular and chemical nature of fundamental biology through the discovery of atomic structures of previously unknown biological structures, many of which have proven difficult or impossible to study by conventional structural biology techniques.

In Cryo-EM, a purified solution of a target molecule is first cryogenically frozen into a thin (single molecule thick) film on a carbon grid, and then the resulting grid is imaged with a transmission electron microscope. The grid is exposed to a low-dose electron beam inside the microscope column, and 2D projections of the sample are collected using a camera (film, CCD, direct electron detector, or other) at the base of the column. A large number of such projections are obtained, each of which provides a micrograph containing hundreds of visible, individual molecules. In a process known as particle picking, individual molecules are selected from the micrographs, resulting in a stack of cropped images of the molecule (referred to as "particle images"). Each particle image provides a noisy view of the molecule with an unknown pose. Once a large set of 2D electron microscope particle images of the molecule have been obtained, reconstruction can be carried out to estimate the 3D density of a target molecule from the images.

In Cryo-EM, often millions of 2D particle images of a sample, consisting of hundreds to thousands of copies of a single protein molecule or protein-drug complex (known as a "target"), are captured in an electron microscope. The particle images can then be computationally assembled to reconstruct and refine a 3D model of the target to a desired resolution. Notably, the number of images, level of detail, and level of noise in each image are significantly beyond what a human could reasonably comprehend by examining the images, or mentally or otherwise attempting to interpret the images. In most cases, it is not until all or most of the images (potentially on the order of millions) and their corresponding viewing directions are simultaneously aggregated in the abstract form of complex-number values coefficients of a Fourier series expansion arranged in a 3D grid, that the information contained in the images becomes interpretable by the embodiments described herein. The embodiments described herein generally use approaches and symbols which would be virtually impossible to implement without the use of a computing device; and it is therefore only the clever use of such computing device, as described herein, which allows the approaches, methods and processes described herein to be practically and concretely undertaken.

Generally, the usefulness of a particular Cryo-EM reconstruction for a given target depends on the resolution that is achievable on that target. A high-resolution reconstruction can resolve fine detail including, in a particularly good case, atomic positions to be interpreted from the reconstruction. In contrast, a low-resolution reconstruction may only depict large, globular features of a protein molecule rather than fine detail; thus, making it difficult to use the reconstruction in further chemistry or biological research pipelines.

Particularly for drug development pipelines, high resolution reconstructions of a target can be substantially advantageous. As an example, such high resolution reconstructions can yield extremely valuable insight into whether the target is well-suited for the application of a therapeutic (drug). As another example, high resolution reconstructions can be used to understand the types of drug candidates that may be suitable for the target. As another example, in cases where the target is actually a compound of a protein and a particular drug candidate, high resolution reconstructions can even illuminate possible ways to optimize a drug candidate to improve its binding affinity and reduce off-target binding; thereby reducing the potential for unwanted side effects. Thus, with Cryo-EM reconstructions, approaches that can improve the resolution of a computationally reconstructed 3D result are of high scientific and commercial value.

Resolution in the context of Cryo-EM is generally measured and described in terms of a shortest resolvable wavelength of a 3D structural signal in a final 3D structure output of a structure refinement technique. In some cases, the shortest resolvable wavelength has a resolution being the shortest wavelength that has correct, validate-able signal. The wavelength is typically stated in units of Angstroms ($\frac{1}{10}$ of a nanometer). Whereby smaller values for the wavelength indicate a higher resolution.

As an example, a very high resolution Cryo-EM structure can have a resolution of approximately 2 A, a medium resolution can have approximately 4 A, and a low resolution can be in the range of 8 A or worse. Alongside numerical resolution, interpretability and usefulness of a Cryo-EM reconstruction can depend on the quality of the 3D density map that is reconstructed and whether or not a qualified user can examine the 3D density map with their naked eye to identify critical features of the protein molecule; for example, backbone, side-chains, bound ligands, or the like. The ability of the user to identify these features with accuracy is highly dependant on the resolution quality of the 3D density map.

There are multiple approaches to measuring a confidence, or accuracy, of the resolution estimate described herein. The most common and widely used is the Gold-Standard Fourier Shell Correlation (referred to as "GS-FSC") measure. In GS-FSC, a dataset of 2D images of a target is split in two half-sets, then each half-set is independently refined, using multiple iterations of an iterative 3D structure refinement approach. Particles can be split randomly into equally sized half-sets, so that each half-set represents and independent sample of particle projections.

In the context of the present embodiments, the iterative refinement approach described advantageously uses an expectation-maximization approach. In this case, the expectation-maximization process can have two sub-parts: alignment (E-step) and reconstruction (M-step). The present embodiments particularly focus on the reconstruction (M-step) in a way that can substantially improve resolution and quality of reconstructions. The embodiments described herein, using a regularization technique as described, can provide substantial improvements in resolution, and visual and overall quality, of the 3D maps for appropriate targets beyond what would be expected using other approaches.

In each iteration of the iterative refinement approach, carried out to determine a 3D density map and corresponding GS-FSC, 2D particle images in a particular half-set are first aligned to a most recently computed version of the 3D density map (referred to as a "half-map") associated with that half-set; for example, a version from a previous iterative refinement iteration. For each half-set, the particle images in each half-set, along with the alignments, are used to reconstruct a new version of the 3D density map. Thus, the two resulting 3D half-maps will contain the same 3D structure. Advantageously, the two 3D half-maps are derived from independent data, and thus the 3D structural signal will correlate between the two half-maps, but the noise will generally not correlate between the two half-maps.

The above correlation characteristic can be used to measure the resolution. The two 3D half-maps are each transformed into a Fourier space representation. Each of the half-maps are split into shells of decreasing wavelength, with each Fourier component corresponding to a certain wavelength being assigned to the corresponding shell. A determination is made of a normalized correlation between Fourier components in the same shell for the two half-maps. These correlation values, one at each wavelength from DC to the Nyquist wavelength, constitute a Fourier shell correlation ("FSC") curve; whereby DC represents direct-current, a constant or zero frequency term of the Fourier space representations. Shells where the FSC is high, for example 1.0, can be considered to have very high signal and little to no noise. In contrast, shells where the FSC is low, for example 0.0, have little to no signal and very high noise. When plotted against resolution, the FSC curve for a given target will start out at 1.0 for low resolution shells, then slowly decrease for high resolution shells as the amount of noise in the images overcomes the signal at those high resolutions. The resolution at which the FSC drops below a certain threshold, typically 0.143, is known as the Gold-Standard FSC resolution estimate. The choice of the threshold being 0.143 is derived from statistical properties of the Cryo-EM reconstruction problem, physics of the microscope, a construction of the two half-sets, and an independence assumption between the two half-maps. In some cases, if any of these assumptions are invalidated or the like, a different FSC threshold may need to be used. Together, the Gold-Standard FSC curve and the appropriate threshold can provide a single resolution value for the entire 3D structure.

In an embodiment of the above approach, GS-FSC is determined in every iteration of the refinement algorithm, and at each iteration, this value is reported and/or used to filter the two 3D maps for each half-set. In a particular case, the GS-FSC curve can be used as a low-pass filter on the 3D map, at each iteration, before beginning the next iteration. The purpose of the low-pass filter being to ensure that Fourier shells that contain mostly noise (and therefore have a low FSC) are not passed on to the next iteration of refinement; thus, noise is ideally not allowed to accumulate through iterations. Advantageously, this approach can be used to prevent overfitting and building-up of noise during the refinement process. In this manner, the GS-FSC can be used as a regularizer for the refinement process.

Disclosed herein are systems and methods for 3D structure estimation from 2D electron Cryo-microscopy images using non-uniform refinement. Advantageously, the embodiments described herein provide an approach for regularizing 3D maps, used in a Cryo-EM refinement, which can significantly improve actualized resolution and quality of reconstructions from refinement.

While a resolution measure like GS-FSC is useful because it provides a statistically sound principle by which to estimate the resolution of a structure, GS-FSC assumes that the 3D structure of the target is rigid and uniform throughout. Therefore, GS-FSC has a single resolution throughout. However, almost all protein targets examined using Cryo-EM do not have a single resolution throughout. In most cases, proteins, and protein-drug complexes, have non-uniform resolution throughout their structures. This non-uniform resolution is due to the fact that they are comprised of physical regions with differing properties; for example, regions that are rigid or flexible, regions that are structured or disordered, regions that are partially occupied in only some of the particle images used to reconstruct a 3D map, and the like. For these reasons, a resolution estimate that is "global", i.e., a single value for the entire 3D map, will generally be inherently incorrect because it relies on an incorrect assumption about the physical properties of the target.

Practically, for targets that have a non-uniform resolution, a global resolution estimate will generally underestimate the resolution in some regions (those that have a higher resolution than the average), and overestimate it in other regions (those that have a lower resolution than the average). Such inaccuracies have significant implications during Cryo-EM refinement because a resolution measure is used to regularize the 3D maps. Thus, with a global resolution measure, the regions of a 3D structure that could have been determined to a very high resolution will instead be over-regularized and have a worse resolution; while, those regions that could only have only been determined with a low resolution will instead be under-regularized and have poor quality due to noise building up and overfitting.

Referring now to FIG. 1, a system 100 for 3D structure estimation from 2D electron Cryo-microscopy images using non-uniform refinement, in accordance with an embodiment, is shown. The system 100 can be executed on a suitable computing device; for example, a desktop computer, a laptop computer, a server, or the like.

FIG. 1 shows various physical and logical components of an embodiment of the system 100. As shown, the system 100 has a number of physical and logical components, including a central processing unit ("CPU") 102, random access memory ("RAM") 104, an input interface 106, an output interface 108, a network interface 110, non-volatile storage 112, and a local bus 114 enabling CPU 102 to communicate with the other components. CPU 102 executes an operating system, and various modules 120, as described below in greater detail. RAM 104 provides relatively responsive volatile storage to CPU 102. The input interface 106 enables an administrator or user to provide input via an input device, for example a keyboard and mouse. The output interface 108 outputs information to output devices, such as a display and/or speakers. The network interface 110 permits communication with other systems, such as other computing devices and servers remotely located from the system 100, such as for a typical cloud-based access model. Non-volatile storage 112 stores the operating system and programs, including computer-executable instructions for implementing the operating system and modules, as well as any data used by these services. Additional stored data, as described below, can be stored in a database 116. During operation of the system 100, the operating system, the modules, and the related data may be retrieved from the non-volatile storage 112 and placed in RAM 104 to facilitate execution.

In an embodiment, as described in more detail in the following, the system 100 includes various modules 120; including a particle image module 122, a reconstruction module 124, and an output module 126. In some cases, some or all of the various modules 120 can be executed on a server-side device 32 or a client-side device 26 (shown in FIG. 2), and be in communication with the other modules. An imaging system 130 may further be linked to the system 100 to obtain images for molecular structure estimation. The imaging system 130 generally comprises one or more electron microscopes, or other suitable devices.

Figure 2:
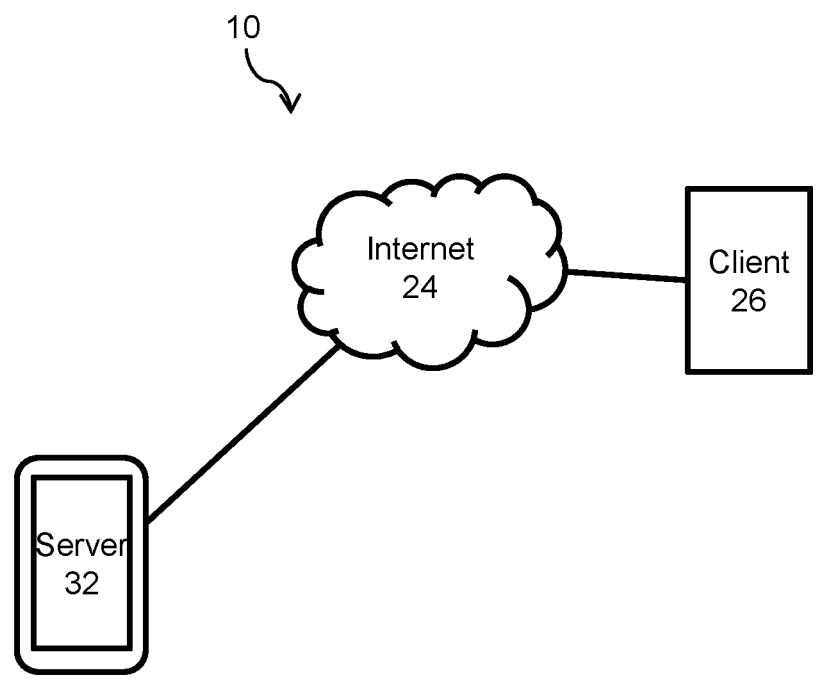
FIG. 2 shows a computing environment of the system of FIG. 1.

In some cases, as shown in a diagram of a computing environment 10 in FIG. 2, the system 100 can communicate with, and retrieve data, from other computing devices; for example, from the server 32 to the client computing device 26. The system 100 can communicate with these devices over a data communication network; for example, the Internet 24.

Figure 3:
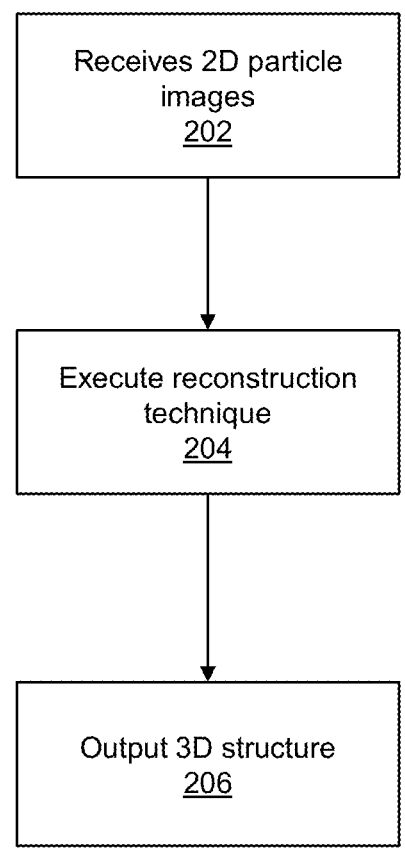
FIG. 3 shows a method for 3D structure estimation of at least one target from a set of 2D Cryo-electron microscope particle images, according to an embodiment.

Turning to FIG. 3, the system 100 executes a method 200 for 3D structure estimation from 2D electron Cryo-microscopy images, in accordance with an embodiment.

At block 202, the particle image module 122 receives a set of 2D particle images of a target from an electron microscope or other imaging system 130. At block 204, the reconstruction module 124 executes a reconstruction technique to determine a likely molecular structure. At block 206, the output module 126 outputs an estimated 3D structure of the target in a resultant 3D map.

Figure 4:
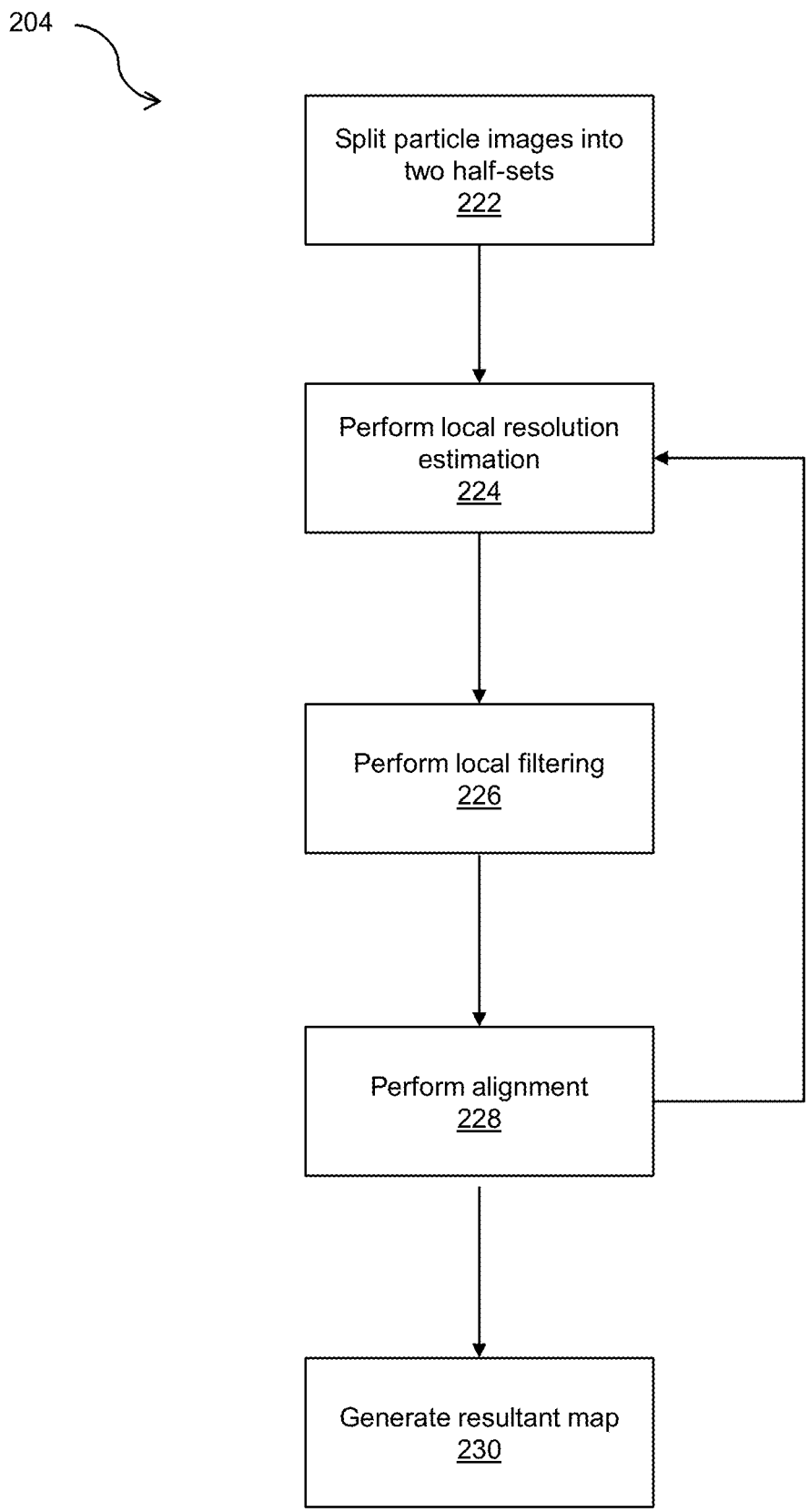
FIG. 4 shows a method for reconstruction, using non-uniform iterative refinement, according to the method of FIG. 3.

FIG. 4 illustrates an embodiment of block 204 for a method for reconstruction, using non-uniform iterative refinement, executed by the reconstruction module 124.

At block 222, the reconstruction module 124 splits the set of 2D particle images into two half-sets, a first half-set and a second half-set. In some cases, the reconstruction module 124 can align a current best version of the 3D density map (referred to as a "half-map") associated with the corresponding half-set; generating a first half-map and second half-map respectively. The best version being a half-map from a previous refinement iteration. The half-maps advantageously allow the reconstruction module 124 to keep the two refinements (of each half-set of particles) independent from each other. In this way, each of the half-maps can be independently improved using their corresponding half-set of particles in each iteration.

The reconstruction module 124 performs non-uniform iterative refinement. For each iteration of the non-uniform iterative refinement, the reconstruction module 124 performs blocks 224 to 228. Any suitable criteria for determining when the iterations can cease may be used. In a particular embodiment, refinement iterations are continued until a global GS-FSC ceases improving, or improves less than a given threshold, from one iteration to the next. Global GS-FSC being the GS-FSC determined over the entire structure, rather than over a subsection (e.g. a windowed subregion); thus being essentially a measure of the overall average resolution of the structure. In another embodiment, the refinement iterations are ceased after a fixed, preferably large, number of iterations.

At block 224, the reconstruction module 124 performs local resolution estimation on both a first half-map of the first half-set and a second half-map of the second half-set. Any suitable local resolution estimation can be used. In an embodiment of the present method, local resolution estimation is executed by the reconstruction module 124 using local windowed FSC; in this case, having a smooth window function and a tunable window size. In another embodiment, local resolution estimation is executed by the reconstruction module 124 based on transforming local regions of the two half-maps into a wavelet basis, and comparing the signal and noise characteristics, in that basis, between the half-maps. In another embodiment, local resolution estimation is executed by the reconstruction module 124 using band-pass filters to isolate signal and noise of particular bands of wavelengths, at each location in the half-maps, and comparing the outputs of those filters.

The reconstruction module 124 can use the local windowed FSC to separately measure the resolution at each position, or at least at multiple positions, of the two half-maps. Positions being a 3D coordinate location on the 3D grid of voxels defining the density map; thus, in this case, the positions being particular voxels. In this way, the reconstruction module 124 isolates a subsection (also known as a "patch" or "window") of a structure. This allows for the reconstruction module 124 to determine the GS-FSC, as applied to the particular subsection, in order to yield an estimate of the resolution in that particular subsection. To measure the local resolution throughout a structure, the reconstruction module 124 selects each position in the 3D structure, in turn, as the center for isolating a patch of a given size (known as the "window size"). The reconstruction module 124 measures the resolution in the isolated patch, and this value becomes the local resolution estimate corresponding to the selected center in question. The reconstruction module 124 uses a set of these local resolution estimates to generate a 3D local resolution map; where each position in the map contains a resolution estimate for the surrounding local region of the target. As an example, some regions of the map can have a very high resolution (for example, 2 A in the central rigid region of a protein), while other regions can have very poor resolutions (for example, 10 A in the disordered lipid nano-disc surrounding a transmembrane protein target).

When determining the local windowed FSC as an estimate of local resolution, the reconstruction module 124 can select a threshold for the FSC. This threshold can be selected such that the resolution at which the FSC drops below the threshold becomes the resolution value for the particular local patch in question. The typical threshold of 0.143 may not applicable in this case because of the local window causing correlations between half-maps regardless of the content of the half-maps. While any suitable FSC threshold can be used, in this embodiment, a threshold of 0.5 is used. This threshold corresponds to a signal-to-noise ratio of 1.0 between the two half-maps. This can yield consistent resolutions estimates and generally does not overestimate resolution.

In another embodiment, the reconstruction module 124 determines the locally filtered version of a 3D map multiple times, each time using different thresholds for the FSC. The reconstruction module 124 can then combine the resultant filtered 3D maps in a weighted sum, where each is map is weighted by the FSC threshold or other measure of signal level. This way, a strong signal is given a high weight, and a weaker signal is down weighted to account for the fact that it may be somewhat corrupted by noise. In an example of the weighted sum, if three thresholds were used to generate three versions of a 3D map at FSC of 0.143, 0.5, and 0.8, then the three maps would be added together with weights of 0.143/(0.143+0.5+0.8), 0.5/(0.143+0.5+0.8), 0.8/(0.143+0.5+0.8) respectively.

When determining the local resolution estimate using local windowed FSC (or other approach), the reconstruction module 124 selects a window size. This window size (also known as kernel size or patch size) determines the size of a local neighborhood that is used in estimating the local resolution around a point. If this size is too small, the local resolution estimate can become noisy. If the size is too large, the neighborhood may include regions that have different local properties, and the estimate will end up as the average of these regions. In an embodiment, the reconstruction module 124 can determine an "adaptive window factor". This factor uses a global resolution estimate of a structure along with the physical size of the structure to compute a reasonable window size. In an example, an adaptive window size can be determined as a multiple of the global GS-FSC of the structure (in Angstroms) divided by the size of one voxel (in angstroms). The multiple (referred to as an "adaptive window factor") can be selected to be, for example, in the range of 5 to 7.

In another embodiment, the reconstruction module 124 determines multiple local resolution estimates with different window sizes. These estimates are then combined to generate a local resolution map with less noise and higher spatial locality. This embodiment can advantageously improve the quality of the 3D maps, especially in cases where there are large discontinuous changes in local properties between adjacent parts of a structure.

In an embodiment, when determining the local resolution estimate, the reconstruction module 124 can estimate the local resolution at every voxel in a 3D grid overlaying the 3D maps. In another embodiment, the reconstruction module 124 can estimate the local resolution at a select number of the voxels, by skipping adjacent voxels with an integer step size, thus determining local resolution at space-apart positions on the half-maps. For example, a step size of one corresponds to estimating local resolution at every voxel. A step size of two corresponds to estimating local resolution at every other voxel in each dimension. Higher step sizes yield less special precision in local resolution estimates, but can reduce computational expense. In a further embodiment, the reconstruction module 124 can first use a large step size to coarsely determine local resolution estimates. The reconstruction module 124 can then use a finer step size in regions where the resolution is high. Advantageously, this approach can save computational expense without reducing quality in regions where such quality is desired. In another embodiment, the reconstruction module 124 can a coarse step size in some regions of a structure. At voxels in between step locations, the reconstruction module 124 can estimate the local resolution by interpolating from nearby known values. In an example, the interpolation can be calculated using trilinear interpolation in three dimensions. Advantageously, this approach can save computational expense without overly reducing quality.

In general, local resolution estimation, as described herein, does not necessarily follow all the same assumptions as other approaches to GS-FSC. Thus, local resolution estimation may require new validation approaches. In an embodiment, the reconstruction module 124 can validate the local resolution estimation using various techniques; including, noise substitution to quantify the effect of the windowing function. The reconstruction module 124 can also use properties of the windowing function to determine a maximum possible amount of error, in FSC, caused by the local window.

In another embodiment, the reconstruction module 124 can incorporate prior knowledge regarding plausible local resolution estimates for a molecule. This prior knowledge can be used to enforce that the estimated local resolution be plausible. For instance, prior knowledge may indicate that local resolution values should not change drastically from one voxel to the next within a 3D density map, while still being allowed to change over a distance of several voxels. In this case, a filter such as a median filter can be applied to local resolution values to enforce that they remain smoothly changing over space. In the case of a median filter, the estimated local resolution value at each particular voxel is replaced with the median of local resolution estimates amongst voxels within some distance of the particular voxel. Any suitable filter can be used, including a bilinear filter, total-variation filter, smoothness filter, etc.

In another embodiment, the reconstruction module 124 can take each of the half-sets of particle images and further subdivide them into smaller subsets after alignment to the half-maps. In this embodiment, instead of half-maps being compared to compute local resolution values, multiple maps can be generated, one for each subset of particle images within each half map. In some cases, the multiple maps from each half-set can be compared only with each other, giving the advantage that the two half-sets remain completely independent. For example, each half-set can be split into two subsets, yielding quarter-sets. These quarter-sets can be reconstructed into quarter-maps, and a quarter-map from each half can be compared with the other quarter-map from the same half, to yield one local resolution estimate for each half. In further embodiments, the number of subsets can be even greater than four.

At block 226, the reconstruction module 124 performs local filtering. In this case, the 3D local resolution map, along with each half-map from each half-set, is used by the reconstruction module 124 for local filtering. Any suitable local filtering can be used. In an embodiment, a locally adaptive low-pass filter is used; for example, local adaptive Bessel-Lanczos filtering or Gaussian kernel filtering. In general, a local filter is defined by a low-pass cut-off wavelength and the shape of a low-pass filter kernel. In this case, the reconstruction module 124 determines an output map in which the value of each particular voxel is equal to a local low-pass filter kernel multiplied with the voxel values in the input map in a neighborhood around the particular voxel. The low-pass filter kernel's cut-off wavelength used for each voxel of the output map can be different, and can be chosen so that, at each voxel, the cut-off wavelength of the low-pass filter is equal to an estimated local resolution wavelength in the local resolution map at that voxel. In addition to the low-pass cut-off wavelength, in some cases, the reconstruction module 124 chooses the shape of the low-pass filter to have minimal ringing. In this context, ringing is when a selected low-pass filter, when applied to a signal, causes artefacts in the output signal. The strength of these artefacts depends on the shape of the low-pass filter kernel, and in particular how much amplitude the kernel has outside of it's main lobe. Thus, minimal ringing means a filter that produces less or little ringing in its output. For example, the Bessel-Lanczos filter generally has little ringing.

The reconstruction module 124 can use the local resolution to low-pass filter each region of the 3D map differently according to that region's respective local resolution, as described above. The output is a locally filtered 3D map for the first half-map. This locally filtered 3D map, unlike a globally filtered map based on only the global GS-FSC, has high-resolution regions that retain a respective high-resolution signal, and low-resolution regions that have a respective low-resolution signal. In this way, the low-resolution regions, for the most part, do not have noise building up. The reconstruction module 124 repeats the local filtering for the second half-map from the second half-set.

In another embodiment, the reconstruction module 124 performs local filtering using a local windowed Fourier-domain low-pass filter. In this embodiment, each local region of the input map is isolated, then windowed, and transformed into Fourier space representation. Each Fourier component is weighted by a weight, so that low resolution coefficients are not modified, but high resolution coefficients beyond the local resolution at that location are down-weighted. In some cases, the weights come from the local FSC that was determined during local resolution estimation. After weighting, the reconstruction module 124 transforms the signal back to real space from Fourier space, and the values can be used to fill in a locally filtered resultant 3D map.

In another embodiment, the reconstruction module 124 can determine both local resolution estimation and local filtering as a solution to a particular optimization problem. In this embodiment, the two half-maps (or quarter-maps if applied to a half-set of particle images, as described above) are labeled as A and B respectively. An optimization problem is set up where the discrepancy between A and B, after filtering either map, is minimized. For instance:

$$\min_L \|f(A, L) - B\|^2 + \|A - f(B, L)\|^2$$

where L is a local resolution map, containing, at each voxel, a local resolution value, and f(X,L) is any suitable local filtering function, acting on a density map X (in this case, A or B).

In the above case, the local resolution map L is searched over, to find the one that, when used to locally filter volume A, minimizes the dissimilarity with volume B, and when applied to volume B, minimizes dissimilarity with volume A. In this way, the local resolution estimation procedure becomes the process of solving this optimization problem, and is therefore suited precisely to the choice of the filtering function f, which defines the optimization problem. For instance, when the filtering function is a global filtering function (i.e. f applies the same filter at all voxels), then L becomes the same value at all voxels, and is equivalent to the GS-FSC. When the filtering function is a locally adaptive filter, as described above, L becomes different at each voxel, and represents the optimal local resolution to denoise that particular voxel in the A and B density maps. In this embodiment, the optimization process can be carried out by any suitable optimization approach; for example, a quasi-Newton optimization approach such as Limited-Memory Broyden-Fletcher-Goldfarb-Shanno (L-BFGS), or a first-order method such as gradient descent. In this embodiment, priors, as explained above, can also be incorporated into the reconstruction module 124 in a similar way as explained above, or they can also be incorporated directly into the optimization objective function:

$$\min_L \|f(A, L) - B\|^2 + \|A - f(B, L)\|^2 + \lambda P(L)$$

where P(L) is a penalty function that enforces any desired prior knowledge about the values in L and λ is a parameter that controls the strength of the prior. For instance, a simple smoothness penalty might take the form:

$$\min_L \|f(A, L) - B\|^2 + \|A - f(B, L)\|^2 + \lambda \nabla^2 L$$

where $\nabla^2$ is the second-derivative operator.

In the above setting, a solution to the optimization problem can yield local resolution estimates in L that incorporate the desired prior knowledge. In this embodiment, it is also possible to use more than two maps A and B, if multiple subsets of particles from each half-set were used to generate multiple sub-maps, as described above. In this case, the objective function can be extended, with one term comparing each sub-map after filtering with the other sub-maps.

In the case where each half-map (A,B) is split into quarters (A1, A2, B1, B2), the optimization can be performed twice, one between A1 and A2 and one between B1 and B2, so that the two halves remain completely independent inline with GS-FSC. In further cases, some or all of the quarter-sets can be split into further divisible sets; for example, A1, A2, A3, and the like. In this case, the optimization can become, for example, |f(A1)−(A2+A3)|+|f(A2)−(A1+A3)| . . . for each comparison.

In this embodiment, regardless of the number of subsets used or any penalties applied, the filtering function f can take on any suitable form. This includes a form where the function f is a single- or multi-layer neural network parametrized by weights and biases. It also includes a form that is not necessarily a directionally-isotropic filter, meaning that the filter can act differently not only at different locations, but also with regard to signals in different directions in 3D space, and the filter effect in the different directions can be included in the variable L. Furthermore, the filtering function f can also incorporate other features, for example a masking region M, represented as a mask in 3D space, inside of which is non-zero density, and outside of which is solvent. In this setting, the optimization problem can be extended with this second variable M:

$$\min_{L,M} \|Mf(A, L) - B\|^2 + \|A - Mf(B, L)\|^2 + \lambda P(L, M)$$

so that optimizing over both L and M jointly yields an estimate of local resolution at each voxel, along with an estimate of whether or not each voxel is solvent or density.

In this embodiment, it is also appropriate to use an objective function that measures a metric other than the squared norm of the difference between maps. For example, an L1 norm could be used:

$$\min_{L,M} \|Mf(A, L) - B\|_1 + \|A - Mf(B, L)\|_1 + \lambda P(L, M)$$

or any other suitable error function. In some cases, the error function chosen can be matched to a model of the noise present in the 2D images that are used to generate the half-maps A and B.

At block 228, the reconstruction module 124 uses the first locally filtered half-map and the second locally filtered half-map to align the 2D particles from the corresponding first half-set and second half set, respectively. These alignments are influenced by the local properties of the structure; whereby high-resolution regions are retained in high resolution, and low-resolution regions are correspondingly 'smoothed'. In this way, the reconstruction module 124 can focus alignments on the high-resolution regions because such regions quantitatively have more signal. Any suitable approach for aligning 2D particle images to 3D maps can be used, taking into account the regions of differing resolution.

In an embodiment, the reconstruction module 124 aligns 2D particle images to 3D maps based on any suitable approach; for example, brute force search approach, local search approach, importance sampling search approach, 'Branch-and-Bound' approach (referred to as "BnB"), or the like. For the purposes of an exemplary illustration, one such alignment approach, the 'Branch-and-Bound' approach, can be performed as described below.

BnB alignment can lead to significant reductions in processing time. The reconstruction module 124 performs BnB generally as follows. When searching for the minimum of some objective function, the search space is subdivided (branch) and a technique is determined for inexpensively discarding (bound) regions of the search space that cannot possibly contain the minimum. The bound step of BnB requires both an upper and lower bound on the objective function, and typically finding a technique for determining a useful lower bound is more challenging. The bound, given a search region, is designed to determine whether a specified region could possibly contain the minimum, and if not then the region as a whole can be discarded. A powerful and useful lower bound has two qualities: inexpensive computational requirements, since the evaluation is conducted many times, and that the evaluation results in many discarded regions, meaning that the bound is tight and actually provides useful information.

For BnB alignment, the reconstruction module 124 generally computes and minimizes a negative log probability of a particle image X (2D) given a model M (3D). This is a function of the latent variables describing the pose r and shift t. The likelihood is:

$$p(X \mid M, r, t) = \frac{1}{Z}\exp\left(\Sigma_l \frac{-1}{2\sigma_l^2} |C_l Y_l(r) - S_l(t) X_l|^2\right), \text{ where } Y_l(r) = \phi_l(r)M$$

Here, both image X and model M are represented in Fourier space. Y(r) denotes the projection of model M along the pose given by r. Poses can be parameterized in any suitable fashion but the axis-angle formulation is applied in the current embodiment. The subscript l denotes a two-component index of a particular Fourier coefficient, also known as a wavevector. For instance l=(0,0) would be the DC component, l=(1,2) would be the Fourier component for wave with 1 cycle in the x-dimension and 2 cycles in the y-dimension. The sum over l is shorthand for summing over all wavevectors in 2D. C denotes the Contrast Transfer Function (CTF) of the microscope (or other image capturing apparatus), and $\phi_l(r)$ is a linear projection operator which in Fourier space is the slice operator with pose r, for wavevector l. S denotes the 2D phase shift corresponding to a shift of t (2D) pixels. Z can be ignored because it does not depend on r, t. The noise model $\sigma_l$ represents the level of Gaussian noise expected in the images, with a possibly different variance for each Fourier coefficient (which allows for white or colored noise models). For clarity in the following, $\sigma_l$ is set to $\sigma_l=\sigma=1$ but the general case would be apparent to a person of skill in the art. Next, the negative log is taken to arrive at our objective function which ends up being the squared error:

$$E(r,t)=\Sigma_l 1/2|C_l Y_l(r)-S_l(t)X_l|^2$$

The goal is to minimize $E(r,t)$ which depends on the image X and model M.

Current approaches to Cryo-EM alignment use exhaustive scan to search over poses and shifts. In exhaustive scan, a discrete set of poses $r \in R$ and shifts $t \in T$ are used and the minimum error pose on this discrete grid is found by directly evaluating $E(r,t)$ at each pose and shift and selecting the best one. In using exhaustive scan, an assumption is made that the sampling used in R and T is fine enough to capture the variations in $E(r,t)$, so that the best looking pose within the discrete grid will actually be close to the minimum of $E(r,t)$.

Unlike local searches, which can also be used to provide a modest speedup, the BnB technique described here is guaranteed to find the best pose in the sets R, T without requiring an exhaustive scan.

The reconstruction module 124 sets a lower bound. The core difficulty in employing a BnB approach is to derive bounds that are cheap to evaluate but informative about the objective function $E(r,t)$. This usually requires insight into the characteristics of E.

The setting of the lower bound takes as an assumption that if a 2D image aligns poorly to a 3D structure at low resolution, it will probably not align well at high resolution. This means that if the likelihood of an image is evaluated using only its low resolution Fourier coefficients, this is likely to provide knowledge about which regions of pose and shift space are worth pursuing at high resolution.

The negative log-likelihood is a sum-of-squared-errors. This means that each Fourier coefficient is equivalent, and each contributes independently with equal weight to the total squared error E. The contribution of each Fourier coefficient is related to its power. If a Fourier coefficient in the model with wavevector l has no power, that coefficient will only contribute a term equal to $\frac{1}{2}|X_l|^2$ to E, and that term does not depend on the pose (r,t) and thus does not need to be considered during search. The bound described herein shows and exploits the fact that a Fourier coefficient in the model that has non-zero but small power also gives a small and limited possible pose-dependent contribution to E.

Therefore, if particular Fourier coefficients of the model at higher resolutions have limited power, there is a limit to how much they can impact the squared error E. If the low frequency coefficients already have a certain amount of error at a particular pose and shift, the high frequency coefficients cannot make this much better or worse. This sets a basis for constructing a bound on E that uses inexpensive evaluations of the squared error at low resolutions to bound true values of E, enabling the elimination of search regions after only evaluating them inexpensively at low resolution.

It is desired to derive a lower bound that is always less than E. To start, E is split into two parts:

$$E(r,t)=\Sigma_{\|l\| \leq L} 1/2|C_l Y_l(r)-S_l(t)X_l|^2+\Sigma_{\|l\| \geq L} 1/2|C_l Y_l(r)-S_l(t)X_l|^2 \quad (1)$$

$$E(r,t)=U(r,t)+V(r,t) \quad (2)$$

Thus, U is the squared error of Fourier coefficients at or below some radius in Fourier space L, and V is the squared error of coefficients above that radius.

In order to bound E, U is directly computed, which is cheap, but V is bounded from below. To do this, V is split into parts.

$$V(r, t) = \Sigma_{\|l\|>L} \frac{1}{2}|C_l Y_l(r) - S_l(t)X_l|^2 \quad (3)$$

$$= \Sigma_{\|l\|>L} \frac{1}{2}|X_l|^2 + \Sigma_{\|l\|>L} \frac{1}{2}C_l^2|Y_l(r)|^2 - \Sigma_{\|l\|>L} \mathcal{R}(C_l Y_l(r)^* S_l(t)X_l) \quad (4)$$

$$= V_1 + V_2 - V_3 \quad (5)$$

Here, the fact that $|S_l(t)|=1$ is used, and also assumed that the CTF is real-valued. The first term, $V_1$, is the power of the image at high frequencies, and does not depend on r,t. The second term is the power of a slice from pose r of the model at high frequencies. This does not depend on t. The third term is the correlation between the shifted image X and the slice of the model.

First $V_3$ is examined; an upper bound on $V_3$ contributes to a lower bound on V. The Cryo-EM image formation model is employed to start. This model says that the observed image X is a sum of a CTF-corrupted true signal plus independent, identically distributed noise. This means $X_l$ can be written as $X_l=C_l \tilde{X}_l+\eta_l$ where all $\eta_l$'s are independent, identically distributed complex normal random variables with $$V_3 = \Sigma_{\|l\|>L} C_l^2 \mathcal{R}(Y_l(r)^* S_l(t) \tilde{X}_l) + \Sigma_{\|l\|>L} \mathcal{R}(C_l Y_l(r)^* S_l(t)\eta_l) \quad (6)$$

$$= \Sigma_{\|l\|>L} C_l^2 \mathcal{R}(Y_l(r)^* S_l(t) \tilde{X}_l) + H \quad (7)$$

$$\leq \Sigma_{\|l\|>L} C_l^2 |Y_l(r)||\tilde{X}_l| + H \quad (8)$$

and it is assumed that $\sigma_l=1$.
This results in $$\eta_l \sim \mathcal{CN}\left(0, \frac{\sigma_l^2}{2}\right)$$

Here, H is the random variable corresponding to the correlation between the model slice Y(r) and the random noise $\eta$. H indicates how much to reasonably expect the noise to affect E. H can be written as:

$$H = \Sigma_{\|l\|>L} \mathcal{R}(C_l Y_l(r)^* S_l(t)\eta_l) \quad (9)$$

$$= \Sigma_{\|l\|>L} C_l \mathcal{R}(Y_l(r)^* \eta_l) \quad (10)$$

$$= \Sigma_{\|l\|>L} C_l \mathcal{R}\left(Y_l(r)^* \mathcal{CN}\left(0, \frac{\sigma^2}{2}\right)\right) \quad (11)$$

$$= \Sigma_{\|l\|>L} C_l \mathcal{R}\left(\mathcal{CN}\left(0, \frac{\sigma^2}{2}|Y_l(r)|^2\right)\right) \quad (12)$$

$$= \Sigma_{\|l\|>L} \mathcal{N}\left(0, \frac{\sigma^2}{2}|Y_l(r)|^2\right) \quad (13)$$

$$= \mathcal{N}\left(0, \Sigma_{\|l\|>L} \frac{\sigma^2}{2}C_l^2|Y_l(r)|^2\right) \quad (14)$$

In the first line above, the noise variables $\eta_l$ are uniform over phase, and so are invariant to phase shifting by $S_l(t)$.

The final line means that H, the contribution to V from noise in the image, is normally distributed with the variance as given above. The standard deviation of H can be written as $$\sigma_H = \sqrt{\Sigma_{\|l\|>L} \frac{\sigma_l^2}{2} C_l^2 |Y_l(r)|^2}$$

Returning to $V_2$ and $V_3$:

$$V_2 - V_3 = \Sigma_{\|l\|>L} \frac{1}{2} C_l^2 |Y_l(r)|^2 - \Sigma_{\|l\|>L} \mathcal{R}(C_l Y_l(r)^* S_l(t) X_l) \quad (15)$$

$$V_2 - V_3 \geq \Sigma_{\|l\|>L} \frac{1}{2} C_l^2 |Y_l(r)|^2 - \Sigma_{\|l\|>L} C_l^2 |Y_l(r)| |\tilde{X}_l| - H \quad (16)$$

$$= \Sigma_{\|l\|>L} \frac{1}{2} \left( C_l^2 |Y_l(r)|^2 - 2 C_l^2 |Y_l(r)| |\tilde{X}_l| \right) - H \quad (17)$$

$$= \frac{1}{2} \left( Y(r)^T D Y(r) - 2 Y(r)^T D \tilde{X} \right) - H \quad (18)$$

Equation 18 is written in vector form. Y(r) is a vector where each element is the absolute value of a Fourier coefficient $|Y_l(r)|$. Similarly $\tilde{X}$ is a vector of $|\tilde{X}_l|$. D is a diagonal matrix of the CTF squared. Equation 18 is a quadratic form in Y(r). Turning again to the image formation model it is assumed that in the image, the true signal $\tilde{X}$ is actually a slice of the model in Fourier space. That means that $\tilde{X}$ is a slice of M from the true pose pose $r^*$; $\tilde{X}_l = Y_l(r^*)$. Since Equation 18 is a quadratic form in Y(r) with a positive semi-definite Hessian D, it can be said that the minimum of this expression with respect to Y(r) occurs when Y(r)=$\tilde{X}$. This is attained when $r=r^*$ is chosen, meaning that the value of the expression at its minimum is $-\frac{1}{2}\tilde{X}^T D \tilde{X} - H$. Finally, since the true signal $\tilde{X}$ is unknown, this value is unknown. However, since it is known that $\tilde{X}_l = Y_l(r^*)$, it can be said that at minimum, it will be $$-\frac{1}{2} \tilde{X}^T D \tilde{X} \geq \min_r -\frac{1}{2} Y(r)^T D Y(r)$$

attained at $\hat{r}$ with $\hat{Y} = Y(\hat{r})$. This is a value that can be easily computed for the given model M, since it is independent of the image X and also doesn't depend on poses or shifts r,t. It is the CTF-corrupted power at high frequencies of the slice of M that has the most power.

Thus, it is finally arrived at $$V_2 - V_3 \geq -\Sigma_{\|l\|>L} \frac{1}{2} C_l^2 |\hat{Y}_l|^2 - H$$

From the above, it follows that:

$$E(r, t) \geq U(r, t) + V_1 - \Sigma_{\|l\|>L} \frac{1}{2} C_l^2 |\hat{Y}_l|^2 - H$$

Due to the presence of H, this expression provides a probabilistic bound on E, indicating that the probability of E is greater than the value of the expression. In an example, a probability, 0.999936, which corresponds to four standard deviations of H, is selected to arrive finally at the lower bound on E(r,t):

$$E(r, t) \geq U(r, t) + V_1 - \Sigma_{\|l\|>L} \frac{1}{2} C_l^2 |\hat{Y}_l|^2 - 4\sigma_H \quad (19)$$

$$= U(r, t) + V_1 - \Sigma_{\|l\|>L} \frac{1}{2} C_l^2 |\hat{Y}_l|^2 - 4 \sqrt{\Sigma_{\|l\|>L} \frac{\sigma^2}{2} C_l^2 |Y_l(r)|^2} \quad (20)$$

$$\geq U(r, t) + V_1 - \Sigma_{\|l\|>L} \frac{1}{2} C_l^2 |\hat{Y}_l|^2 - 4 \sqrt{\Sigma_{\|l\|>L} \frac{1}{2} C_l^2 |\hat{Y}_l|^2} \quad (21)$$

$$= B_L(r, t) \quad (22)$$

In the last line, the maximum power slice $\hat{Y}$ is again used, and that $\sigma=1$.

At this point, an expression is arrived at which, with very high probability, bounds E(r,t) from below. This expression is cheap to compute for an particular r,t (since only U depends on these), and the remainder only needs to be computed once for all r,t, and also only once for all images that share the same CTF; i.e., that come from the same micrograph. To compute the bound, it is only needed to find the slice of the model which has the most power ($\hat{Y}$). Then the expression is used to compute the values of U and the power of the image $V_1$.

The bound above is actually a family of bounds, one for each radius L. As L is increased, the bound becomes more expensive but tighter, and finally when L reaches the Nyquist rate then the bound becomes exact, but is as expensive as directly computing E(r,t).

Upon establishing a lower bound, an upper bound is established.

As an upper bound on E(r,t), a single direct evaluation of E at a specific pose and shift can be used. During optimization, a candidate best pose and shift $r^*,t^*$ are maintained, and are used to compute $E^*=E(r^*,t^*)$, the upper bound on the minimum of E. It can be said that the minimum of E(r,t) can not be greater than $E^*$, because that would be a contradiction—every E(r,t) for all r,t must be greater or equal to the value at the minimum.

The lower bound derived above, $B_L(r,t)$, can be used to develop an approach to search over poses and shifts faster than exhaustive search without loss of alignment accuracy. With the theoretical support of the bound in place, very similar but more effective approximate bounds and techniques are described.

From the starting point of exhaustive search, the following BnB optimization using the bound $B_L$ is introduced. Here $R_0$ and $T_0$ are the discrete grids that would have been used for exhaustive search. L is initialized as $L=L_0$ (120). R and T are initialized as $R=R_0$, $T=T_0$. While it is determined that a selected accuracy of image alignment has been obtained, in this case being that L is less than the Nyquist rate, poses are evaluated, after which L is doubled. In further cases, the selected accuracy of image alignment has been obtained when a selected number of iterations have been performed.

For the evaluation of poses, $B_L(r,t)$ is computed for all r,t in R, T. The $r^*,t^*$ with minimum $B_L$ are located. $E^*=E(r^*,t^*)$ is evaluated. For every r in R, if $\min_t B_L(r,t)$ is greater than $E^*$, r is removed from R. For every t in T, if $\min_r B_L(r,t)$ is greater than $E^*$, t is removed from T.

Once $L \geq N/2$, $r^*,t^*$ are returned, which represent the pose and shift of the optimal alignment of the image to the structure.

As this technique progresses, poses and shifts are identified that cannot be the minimum E because the lower bound at that pose is greater than the current best value of E. As these points are identified, they are removed from the set of candidate poses and shifts. Upon termination, only the pose and shift with minimum E will remain.

Note that this approach begins by evaluating $B_{L_o}(r,t)$ for all of R, T, as opposed to exhaustive scan, which would have evaluated E(r,t) for all R, T. The cost of computing E(r,t) is proportional to $(N/2)^2$ and the cost of computing $B_L(r,t)$ is proportional to $L^2$. This means that, at best, the speedup that can be achieved with this technique is $$\left(\frac{N/2}{L_0}\right)^2.$$

In some scenarios this is about 100, but speedups on the order of 20-30 can be achieved in other scenarios.

In another implementation, some approximations can be made to yield an approach that is similar, but provides much larger speedups. The existence and tightness of bound $B_L(r,t)$ indicate that low-resolution alignment provides significant information about high-resolution alignment.

Consider first bound $B_L$. To compute it, the slice Y of model M which has the largest CTF-corrupted power can be found. One drawback of this computation is that it needs to be redone for each set of images that has a different CTF. The CTF, at frequencies above L, is like a sine function with a varying frequency. The RMS power of the CTF is thus close to $1/\sqrt{2}$. An approximation can be made and it can be assumed that $$\Sigma_{\|u\|>L}\tfrac{1}{2}C_i^2|\hat{Y}_l|^2 \approx \tfrac{1}{2}\Sigma_{\|u\|>L}\left(\tfrac{1}{\sqrt{2}}\right)^2|\hat{Y}_l|^2 = \Sigma_{\|u\|>L}\tfrac{1}{4}|\hat{Y}_l|^2$$

This expression no longer depends on the CTF, so the approximate bound can be entirely independent of the image, and only needs to be computed once, given the model. Note that this approximation of the CTF does not actually make the bound tighter, rather it removes the dependence on the image.

Again consider the above expression. A search is performed over slices Y to find the one with the maximum power. The maximum power slice, $\hat{Y}$, gives a strict limit on how much power there could be at high frequencies that might contribute to E. However, it is very unlikely that for any given image, the true pose will be the same as the pose of $\hat{Y}$, since most images do not come from the maximum power slice. Thus, the slice Y† that has the median power of all slices can be used as an approximation instead of the maximum (or any other rank statistic).

All together, the above approximations lead to an approximate lower bound for E(r,t) as $$A_L(r,t) = U(r,t) + V_1 - \Sigma_{\|u\|>L}\tfrac{1}{4}|Y_l^\dagger|^2 - 4\sqrt{\Sigma_{\|u\|>L}\tfrac{1}{4}|Y_l^\dagger|^2}$$

Instead of the BnB approach described above, any suitable approach for aligning 2D particle images to 3D maps can be used.

Advantageously, for method 200, the 3D half-maps can be used as input for alignment. Alignments for all particles can then be used to reconstruct a new 3D map for each half-set.

At block 230, the reconstruction module 124 can generate the resultant 3D map by combining the first half-map with the second half-map. In an embodiment, the resultant 3D map is generated by averaging, on for example a voxel-by-voxel basis, values of the first half-map with the second half-map.

Local filtering, based on the local resolution map, as described above, can act as a regularizer for the refinement process because the interaction, over repetitive iterations, between the local properties of the 3D maps and the alignment of 2D particles to those maps allows a new signal to be extracted from the data. As the local properties of the structure are better captured in each iteration by the regularizer, the regularizer guides alignments to focus on the correct regions of the structure, and these alignments in turn can be used to improve the 3D structure and its local properties again.

The 3D maps, reconstructed in each iteration, are unfiltered. In this way, in some cases, the 3D maps can be used to measure the global GS-FSC as described herein. This provides a quantitative way to measure the improvement of overall global resolution due to the embodiments described herein. To be noted is that taking the output of a other approaches to global refinement, and subsequently applying local resolution estimation and local filtering, cannot, by definition, add any new information to the resulting 3D structure. Particularly, the local filter can only remove information. Thus, improvements in the global GS-FSC, using the embodiments described herein, indicate that the embodiments are in fact extracting new signal from the input 2D data, since the increased correlation reported by the GS-FSC was not found previously. This contrasts with qualitative measures of improvement, where change in quality can, in some cases, be due only to change in visualization by local filtering. Advantageously, the embodiments described herein can provide improvements for both the visual quality and the GS-FSC of reconstructed structures; illustrating that the embodiments achieve an outcome significantly greater than merely its constituent parts.

Generally, it is accepted that filtering can only remove information in the context of 3D structure estimation. The present inventors advantageously recognized that using filtering inside of iterative refinement can actually, and counter-intuitively to conventional thinking, increase information extracted from the 2D imaging data. The advantages of the present embodiments are particularly pronounced when the structure has large variance in local properties.

Another intended advantage of the non-uniform iterative refinement described herein, above the demonstrated quantitative improvement, is that, in some cases, it is also possible for the visual quality and interpretability of a resultant 3D map to be improved. This improvement is possible even if the global GS-FSC (which is a measure of the overall average resolution of the density map) does not change. In these cases, some regions of the structure where the local resolution is higher can be better detailed in the final map when compared to other approaches to refinement.

The embodiments described herein, using non-uniform iterative refinement, can advantageously produce improved resolution structures in not only rigid parts of the structure, but also in non-rigid parts of the structure because such parts are protected from overfitting and over refinement. This improved resolution is substantially beneficial when visually inspection is conducted on an outputted 3D map. The improved resolution is also substantially advantageous when the output of non-uniform iterative refinement is used in conjunction with subsequent techniques; for example, locally focused refinement. In locally focused refinement, a region of a map is manually selected to be isolated from the rest of the map, and alignments of particles are explicitly forced to only consider that region of the map. In this case, the quality of the initial estimate of the map is very valuable, and this quality can be improved significantly by non-uniform refinement, especially in non-rigid regions where locally focused refinement is particularly useful. In some cases, the non-uniform refinement approach can be used to replace the reconstruction step in other approaches to locally focused refinement. In the combined version, a particular region of the map that has been selected can be isolated, but within that region, non-uniform refinement can be used to treat different sub-regions differently based on their local properties, as described herein.

In the present embodiments, local resolution estimation and local filtering can be advantageously used instead of other approaches, such as solvent masking. Typically, in solvent masking, a 3D mask is generated either by hand or from a previous estimate of a structure. This mask indicates which regions of a 3D map are empty (i.e. filled with solvent rather than protein). During refinement, these regions are set to have zero density. This approach is problematic because solvent has no structure and will therefore typically have a very low local resolution. In contrast with non-uniform iterative refinement, as disclosed herein, the reconstruction module 124 uses the local resolution estimates to automatically provide an estimate of which regions of a structure are empty. Thus, the embodiments disclosed herein advantageously do away with the need to hand set masks, and automatically adjusts the estimated solvent regions throughout refinement.

Figure 5A:
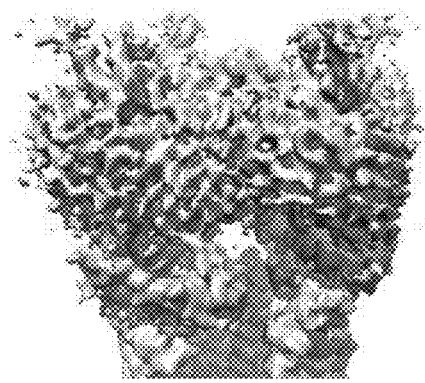
FIGS. 5A to 5C show example 3D maps of an example target generated using global resolution Gold-Standard Fourier Shell Correlation ("GS-FSC")
Figure 5D:
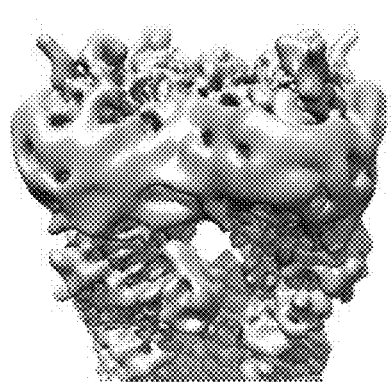
FIGS. 5D to 5F show example 3D maps of the example target of FIGS. 5A to 5C generated using the method of FIG. 3.
Figure 5B:
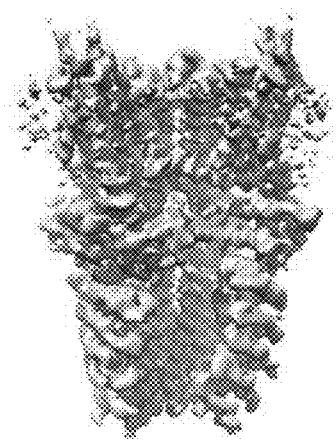
Figure 5E:
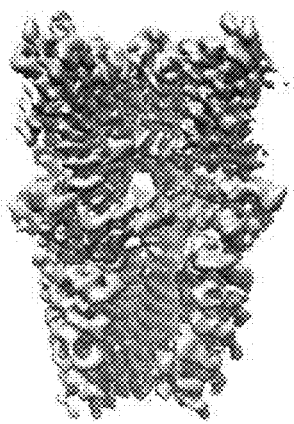
Figure 5C:
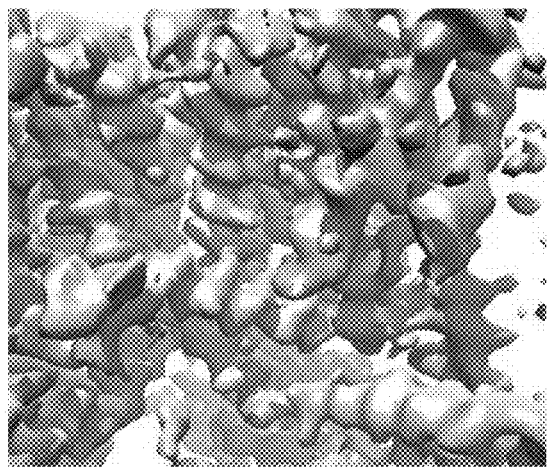
Figure 5F:
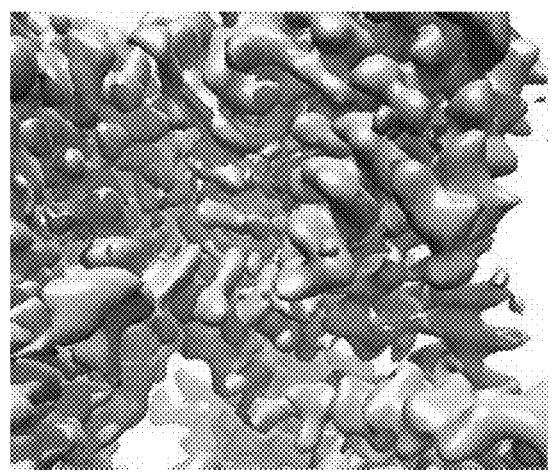

Turning to FIGS. 5A to 5F, illustrated is an exemplary comparison of 3D maps generated from global resolution GS-FSC, shown in FIGS. 5A to 5C, to 3D maps generated using method 200, shown in FIGS. 5D to 5F. As can be seen in FIG. 5A, for low-resolution regions, the global resolution approach has clear overfitting and noise is present in the map. In contrast, as shown in FIG. 5D, such overfitting and noise is not as present in the map generated by method 200. As seen in a comparison of FIGS. 5B and 5E, noise level is reduced and signal level is increased in the map generated by method 200. As seen in a comparison of FIGS. 5C and 5F, high resolution detail can be significantly improved with method 200. Specifically, side chains and structural details are significantly more visible in the rigid regions of the structure.

Figure 6A:
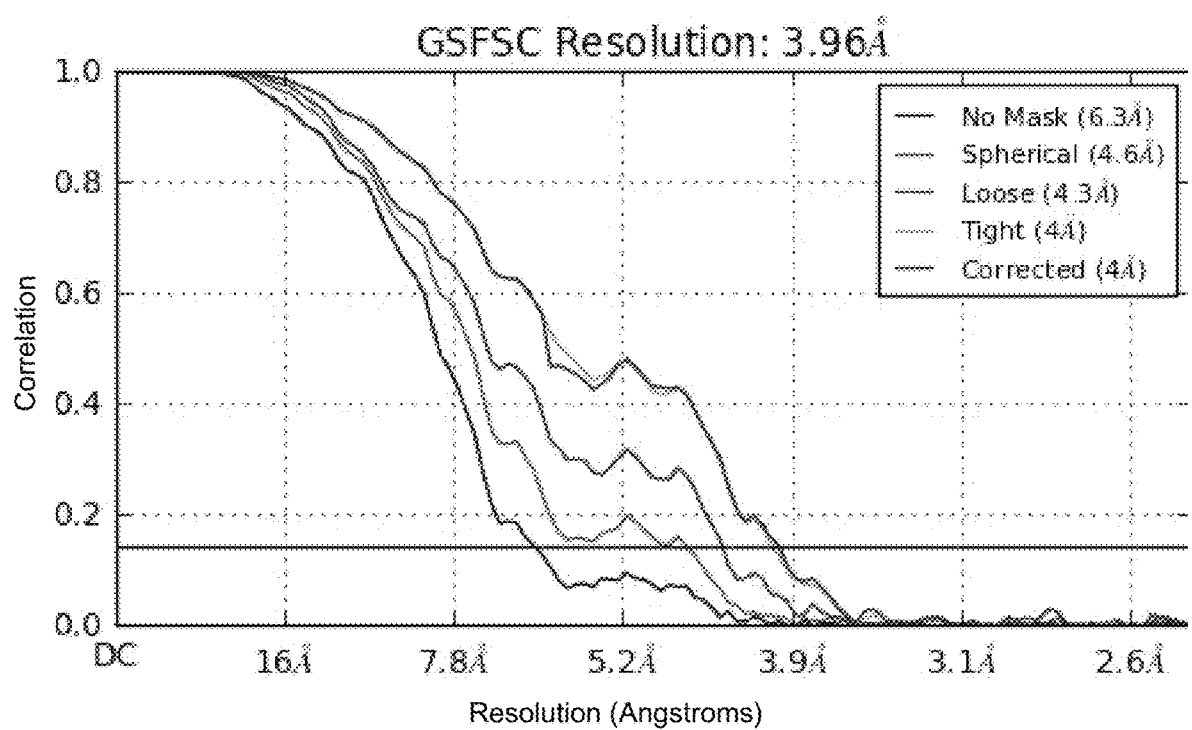
FIG. 6A illustrates a quantitative analysis of GS-FSC on the example target of FIGS. 5A to 5C.
Figure 6B:
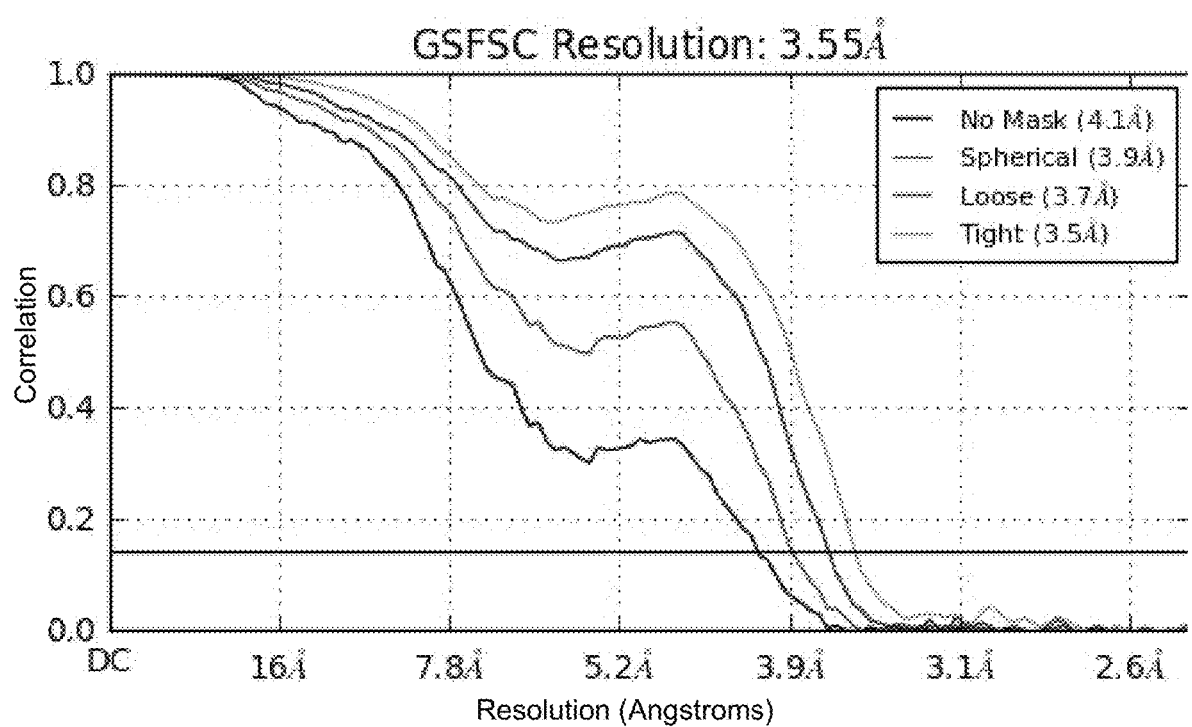
FIG. 6B illustrates a quantitative analysis of the method of FIG. 3 on the example target of FIGS. 5D to 5F.

Turning to FIGS. 6A and 6B, the present inventors conducted a quantitative comparison of GS-FSC with standard refinement to non-uniform refinement, according to method 200, on the example target shown in FIGS. 5A to 5F. GS-FSC with standard refinement is shown in FIG. 6A, and non-uniform refinement, according to method 200, is shown in FIG. 6B. As shown, the method 200 has an improvement on GS-FSC of 3.96 A (without method 200) compared to 3.56 A (with method 200) with smaller values of wavelength indicating better resolution, which is a significant improvement of almost 16%. As shown, the area under the FSC curve, also indicative of signal quality, is also significantly improved. This demonstrates that the non-uniform refinement of method 200 is advantageously extracting new signal from the input 2D data that was not captured previously by standard refinement.

Figure 7:
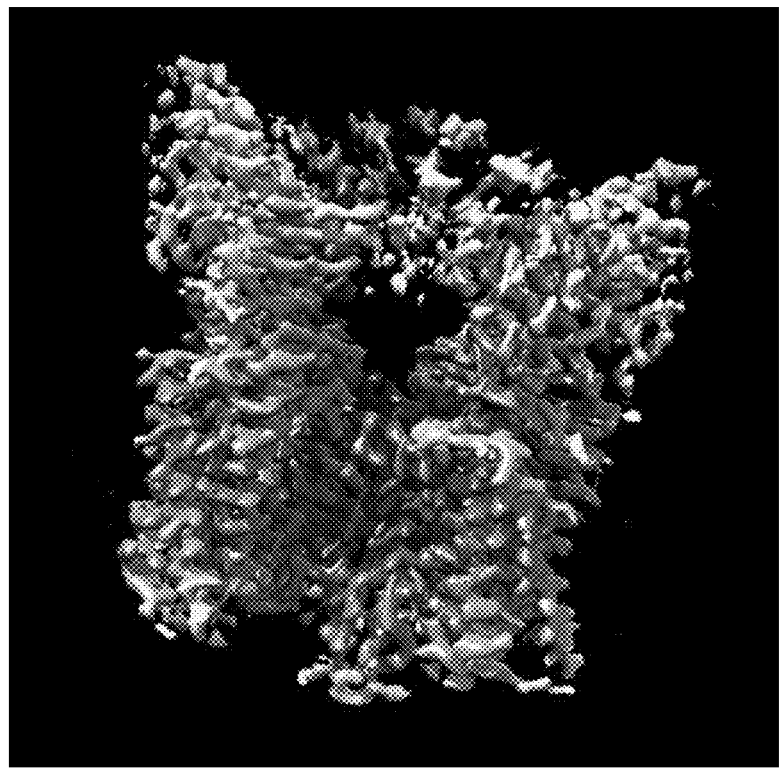
FIG. 7 illustrates an exemplary local resolution map determined using the method of FIG. 3.

FIG. 7 illustrates an exemplary local resolution map determined using non-uniform refinement according to method 200. The map shows regions that are more rigid (generally darker in color) and those that are more flexible (generally lighter in color).

Though described in many instances specifically with respect to Cryo-EM images for simplicity and clarity of illustration, the systems and methods are adaptable to other imaging modalities with necessary modifications. The embodiments are applicable to a range of imaging modalities where reconstruction of a 3D structure is desired from 2D images representing specific poses of a 3D target, which may be a protein, virus or other molecule, or any entity imaged by way of a transmissive imaging modality. Specifically, the embodiments are applicable to images of any transmissive object imaged with a suitable wavelength energy beam, including biological specimens with electron beams, soft tissue with x-ray beams, translucent objects with light, etc. Furthermore, though described in many instances specifically in the context of the reconstruction of a single 3D structure from each dataset of 2D images, the invention is applicable to the simultaneous reconstruction of multiple 3D structures from each dataset, with each structure representing one of a multitude of different targets present in the dataset.

While the embodiments described herein are described with respect to generating two half-sets, it is contemplated that in further embodiments, the particle projections may be divided into a greater number of sets. It is also contemplated that sets may be subdivided into other ratios than half-half.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A method for generating 3D structure estimation of at least one target from a set of 2D Cryo-electron microscope particle images, the method executed on at least one processing unit, the method comprising:
   receiving the set of 2D particle images of the target from a Cryo-electron microscope;
   splitting the set of particle images into at least a first half-set and a second half-set;
   iteratively performing:
      determining local resolution estimation and local filtering on at least a first half-map associated with the first half-set and a second half-map associated with the second half-set, the determination comprising performing optimization, the optimization comprising minimizing a discrepancy between the first half-map and a filtered second half-map and a discrepancy between a filtered first half-map and the second half-map, the local filtering comprising a parameterized filtering operation that comprises performing at least one of local adaptive filtering, non-isotropic filtering, and masking;
      aligning 2D particles from each of the half-sets using at least one region of the associated half-map;
      for each of the half-maps, generating an updated half-map using the aligned 2D particles from the associated half-set; and
      generating a resultant 3D map using the half-maps; and
   outputting an estimated 3D structure of the target based on the resultant 3D map.

2. The method of claim 1, wherein minimizing the discrepancy comprises minimizing the squared distance between the locally filtered first map and the second map, added to the squared distance between the first map and the local filtered second map.

3. The method of claim 1, further comprising splitting the first half-set into a first quarter-set and a second quarter-set and splitting the second half-set into a third quarter-set and a fourth quarter-set; and wherein the local resolution estimation and the local filtering are performed on quarter-maps associated with each quarter-set, the aligning performed on each of the quarter-maps, the updating performed on each of the quarter-maps, and the generating a resultant 3D map uses the updated quarter-maps.

4. The method of claim 3, wherein performing local resolution estimation and performing local filtering can be collectively determined by performing optimization, the optimization comprising minimizing a discrepancy between the first quarter-set and the second quarter-set and between the third quarter-set and the fourth quarter-set, after each quarter-set is filtered by a parameterized filtering operation.

* * * * *